(12) United States Patent
Denzin

(10) Patent No.: US 7,634,821 B2
(45) Date of Patent: Dec. 22, 2009

(54) CANISTER FLUSH VALVE

(75) Inventor: Peter W. Denzin, Glenbeulah, WI (US)

(73) Assignee: Kohler Co., Kohler, WI (US)

( * ) Notice: Subject to any disclaimer, the term of this patent is extended or adjusted under 35 U.S.C. 154(b) by 526 days.

(21) Appl. No.: 11/268,151

(22) Filed: Nov. 7, 2005

(65) Prior Publication Data

US 2007/0101485 A1    May 10, 2007

(51) Int. Cl.
E03D 1/34    (2006.01)
(52) U.S. Cl. .................. 4/378; 4/390; 4/391
(58) Field of Classification Search ............ 4/390–404, 4/378, 324
See application file for complete search history.

(56) References Cited

U.S. PATENT DOCUMENTS

| | | |
|---|---|---|
| 1,871,579 A | 8/1932 | Bashara |
| 1,895,786 A | 1/1933 | Cobb |
| 2,239,923 A | 4/1941 | May |
| 2,795,237 A | 6/1957 | Corbin, Jr. |
| 3,080,567 A | 3/1963 | King |
| 3,172,129 A | 3/1965 | Fulton et al. |
| 3,267,491 A | 8/1966 | Snyder et al. |
| 3,383,711 A | 5/1968 | Swanson |
| 3,555,572 A | 1/1971 | Thomas |
| 3,596,293 A | 8/1971 | Thomas |
| 3,890,652 A | 6/1975 | Fulton |
| 3,916,455 A | 11/1975 | Longdin |
| 4,298,204 A | 11/1981 | Jinkins |
| 4,357,720 A | 11/1982 | Stahli |
| 4,557,000 A * | 12/1985 | Strangfeld ............... 4/324 |
| 4,604,763 A | 8/1986 | Sprang |
| 4,882,793 A | 11/1989 | Thompson |
| 5,265,282 A | 11/1993 | Schmucki |
| 5,305,474 A | 4/1994 | Nardi et al. |
| 5,329,647 A | 7/1994 | Condon |
| 5,349,981 A | 9/1994 | Schmucki et al. |
| 5,502,846 A | 4/1996 | Chelchowski et al. |
| 5,653,252 A | 8/1997 | Steg et al. |
| 5,657,494 A | 8/1997 | Diethelm |
| 5,896,593 A | 4/1999 | Mizrahi |
| 5,926,861 A | 7/1999 | Frost |
| 6,276,552 B1 | 8/2001 | Vervisch |

(Continued)

FOREIGN PATENT DOCUMENTS

EP    1477618 A    11/2004

OTHER PUBLICATIONS

PCT International Search Report, and Written Opinion.

*Primary Examiner*—Tuan N Nguyen
(74) *Attorney, Agent, or Firm*—Quarles & Brady LLP

(57) ABSTRACT

A canister type flush valve has an upright cup-shaped hollow float working under buoyancy forces without a captured air volume that controls the valve during a flush cycle. Hooded bleed openings at a bottom wall of the float can be sized and numbered to selectively control the closuring timing of the valve. Baffles of the hood bleed openings redirect water bleeding into the float to prevent the water from spraying up against the top of the tank. The geometry of a seal retaining groove is designed to reduce leakage at the float/seal interface. For example, the groove has an annular wall with a compound profile forming a non-cylindrical, preferably serpentine, seal contact area. The seal is backed by a slotted flange located just above the retaining groove.

12 Claims, 6 Drawing Sheets

U.S. PATENT DOCUMENTS 6,457,187 B1  10/2002  Andersson et al.
6,715,162 B2   4/2004  Han et al.
6,728,975 B2   5/2004  Han
6,874,172 B2   4/2005  Frost
6,910,232 B2   6/2005  Antunez

* cited by examiner

CANISTER FLUSH VALVE

CROSS-REFERENCE TO RELATED APPLICATIONS

Not applicable.

STATEMENT OF FEDERALLY SPONSORED RESEARCH OR DEVELOPMENT

Not applicable.

BACKGROUND OF THE INVENTION

The present invention relates to flush valves that control the flow of water from toilet tanks to toilet bowls. More particularly it relates to canister flush valves.

Many systems for controlling the flush of toilet tank water to a toilet bowl are known, see e.g. U.S. Pat. Nos. 5,329,647 and 5,896,593. Such systems have a water inlet valve for the tank that is typically controlled by a float that senses tank water level. Depressing the trip lever moves a flush valve at the tank outlet so that water can empty from the tank through a vitreous pathway and into the bowl. As the tank water drains, the inlet valve float drops with the water level in the tank, thereby triggering inlet water flow. After sufficient tank water is drained, the flush valve closes so that the water level in the tank can be re-established. As the tank refills, the inlet valve float rises with the water and eventually closes the inlet valve to shut off the water supply.

A variety of flush valves have been devised for controlling the flow of water from the tank to the bowl. One of the most common in use today is the flapper type flush valve. Flapper flush valves have a pivotal yoke that supports a large diameter stopper that seals off the tank outlet until the trip lever is tripped to start a flush cycle. The large stopper is filled with air which slows its reseating until sufficient water has been drained from the tank. Another type of flush valve has a dedicated float that mounts a main seal. When the trip lever is depressed, the float is raised and the seal unseats to allow water to flow from the tank to the bowl. One flush valve of this type is referred to as a "canister" flush valve because the valve often has a large, generally cylindrical, float that resembles a can.

A concern common to many flush valves is creating and maintaining a tight seal at the tank outlet after the flush cycle is complete. The bulbous stoppers of flapper valves are generally initially good at achieving and holding a seal, but over time (e.g. years of operation) may permit leakage. Washer-like seals common in canister valves often have similar problems.

If the seal leaks, water will drain from the tank to the bowl. As the tank drains, the inlet valve float will fall and cause the inlet valve to open to refill the tank. If the leak persists, the inlet valve will remain open and water will continuously drain into the bowl. This will cause the bowl to overflow, or if the bowl has overflow passages, water will pass from the bowl to the building plumbing lines. Water is wasted in either case, which is very undesirable particularly given the emphasis local communities often place on the need for low water consumption toilets.

An example of a canister type flush valve is disclosed in U.S. Pat. No. 6,715,162 to Han et al. The disclosed flush valve has a valve body that mounts in the toilet tank at the outlet opening to the bowl defining a flow passage and an upper valve seat. The valve body also has an upright guide along which the float rides during a flush cycle. The float is a generally cylindrical hollow body with open ends, the upper end being above the water fill height of the tank. Water can flow through the inside of the float and through the valve body in the case of an overflow condition. The bottom end of the float has a groove about its circumference that retains a flat washer-type seal. The seal seats against the valve seat when the float is in its normal state in which the tank water is closed off from the outlet to the bowl.

Sealing problems with conventional canister flush valves, arise from various factors. The primary focus in achieving a good seal in prior devices is on how well the seal mates with the valve seat. While this is important, an often overlooked leak path arises at the float/seal interface. Particularly over time with material shrinkage or degradation of the seal, water may leak through the space between the seal and the float. This can become a low resistance leak path for water in the tank because the interface is typically a short, straight vertical path.

Regarding the contact of the sealing surface of the seal with the valve seat, again over time, it is possible for the seal to deform and take on a somewhat prolapsed configuration such that the seal does not mate properly with the valve seat. Thus, it is important that the seal be mounted to the float with sufficient backside (non-sealing side) support to prevent the seal from flexing away from the valve seat, without obstructing seating of the sealing side of the seal and while providing sufficient downward force on the seal so that a tight seal is maintained. Existing canister flush valves fail in one or more of these areas, and thus provide a less than optimal seal.

Another concern with flush valves is controlling the water consumption of the toilet. Water consumption is largely a factor of the amount of time in which the flush valve is open. For canister type flush valves, this is dependent upon the closure timing of the float, that is, the time it takes after the float is pulled from the valve body for the float to sink and reseat the seal. At least two factors affect the closure timing of the flush valve, namely the manner in which the floatation is achieved and the manner in which the float is caused to sink.

Many flush valves have an inverted cup-shaped float, with an open bottom and a closed top. When the float is pulled up by the flush trip lever, the inverted cup acts like a parachute and slows its descent by the frictional force of the water in the tank. U.S. Pat. No. 5,305,474 to Nardi et al. discloses a flush valve having such a float. Another common type of flush valve has an enclosed hollow vessel as the float. The air captured in the hollow vessel makes it buoyant so that it sinks slowly. U.S. Pat. No. 5,329,647 to Condon is an example of a flush valve with such a closed float. In both cases described above, the floats sink entirely under the force of gravity. The closure time of these valves is thus fixed for a given size and mass of the float.

The valve closure time can be adjusted by allowing water to flow into the float during the flush cycle. For example, as disclosed by U.S. Pat. No. 3,172,129 to Fulton et al., one or more small bleed holes can be made in an otherwise enclosed float, such as in the bottom wall of the float. When the float is pulled upward during a flush cycle, water in the tank can flow through the bleed holes into the interior of the float, thereby increasing the overall mass of the float and causing it to sink at an increased rate so as to shorten the closure time of the valve. The size and quantity of the openings can be selected to achieve a closure rate that corresponds to a desired water consumption.

One problem, however, with the use of bleed holes is that immediately after the float is moved, the pressure head in the tank is relatively high such that water will rush into the bleed holes quickly. If, unlike in the valve disclosed by Fulton et al., the float is not enclosed at the top, the rapid flow of water through the bleed holes can spray up through the float and against the underside of the tank lid. This is disadvantageous for several reasons, but primarily because of the possibility of the water spraying out the tank, or leaking down around on the rim of the tank, and onto the bathroom floor.

Thus, a need exists for an improved canister type flush valve that provides for better valve closure control and effects a better seal at the tank outlet.

SUMMARY OF THE INVENTION

The present invention is an improved canister-type flush valve for a toilet that addresses the shortcomings of the prior art discussed above. Generally, the canister flush valve has a float and seal arrangement that can be raised by a trip lever from a valve body leading to or defining the tank outlet to unseat the seal, which normally seals off the tank outlet. The float/seal interface is configured to reduce leakage between the float and seal, and seating of the seal is assisted by direct application of water pressure head in the tank. The float is also configured to improve the control of the valve closure time.

In one aspect, the invention provides a canister flush valve having a valve body defining a valve seat and a flow passage leading from the valve seat toward an outlet when installed in a toilet tank. The flush valve has a float mounting a seal on a hollow longitudinally extending body with an open upper end a closed lower end. When installed in the tank, the open upper end extends above a water fill height of the tank to be in communication with ambient air, and the bottom wall at a lower end is below the water fill line. The bottom wall at least acts to restrict flow of water into the hollow body of the float during a flush cycle such that the hollow body can be suspending above the valve seat at least temporarily during the flush cycle by a buoyancy force of the water acting on an outside of the hollow body. Before and after a flush cycle the float is positioned to seat the seal on the valve seat and close off communication of tank water outside of the float with the flow passage. During a flush cycle, the float can be moved with respect to the valve body to unseat the seal and allow water within the tank to pass into the flow passage and out to the bowl.

In preferred forms, the float is generally cup-shaped and oriented upright. The float can define a longitudinal overflow tube within the hollow body in communication with the open end of the hollow body and an opening in the bottom wall. The valve body can include a float guide that is received in the overflow tube, without completely obstructing flow therethrough, along which the float can travel during a flush cycle. The float is preferably molded of a rigid plastic as an monolithic structure.

In another aspect the invention provides a canister flush valve with a float having a hollow body extending along a longitudinal axis and an end wall extending at an angle to the axis. The end wall has at least one bleed opening therein defining a passage into the hollow body of the float that includes travel along a path at an angle to the axis.

The bleed openings can be numbered, sized, and configured to allow tank water to pass inside the float and cause it to reseat the seal before the tank is completely emptied. This assists in seating the seal by ensuring that a minimum height of water will remain in the tank to provide enough pressure head to seat the seal fully. Moreover, the number of openings as well as the opening size can be changed easily during the molding process as desired to vary closure timing for the water consumption requirements of particular toilet applications.

The bleed openings can have a special hooded configuration including a baffle that is spaced from the float bottom and connected thereto by one or more longitudinal legs between which are longitudinal windows that lead to the corresponding opening in the float bottom. The baffles obstruct flow longitudinally such that when the water enters and leaves the float it must turn and pass radially through the windows. This permits bleed water to pass into the float after a flush cycle is initiated, and then drain out of the float after the seal is reseated, but prevents water rushing into the float from spraying up through the float against the tank lid.

In still another aspect the invention provides a canister flush valve with a float having a seal retaining portion with a compound profile defined by at least one non-cylindrical annular surface. The seal has a peripheral surface mating with the compound profile of the float seal retaining portion to mount to the float for seating against the valve seat.

The float can extend along a longitudinal axis, and the seal retaining portion of the float holds the seal in a radial orientation, generally perpendicular to the longitudinal axis. The compound profile is then defined by an annular longitudinal wall at the seal retaining portion of the float.

The seal can be an annular seal, and the seal retaining portion of the float can be a groove extending about the periphery of the float in the radial direction and opening outward. The annular wall at the closed end of the groove defines the compound profile. An inner periphery of the seal is disposed in the groove and an outer periphery is out of the groove so that the seal can seat against the valve seat. Preferably, the inner peripheral surface is defined by the inner diameter of the seal.

The compound profile of the seal retaining portion, or groove, and the mating inner periphery of the seal define at least inter-digitated joint, such as a tongue and groove. In particular, either the compound profile or the seal or both can have at least one annular projection or peak that meshes with a valley in the other part. The compound profile and/or inner periphery of the seal can be defined by a continuous, non-linear annular surface. In each case, the continuous curved surface can define one or more convex peaks and one or more concave valleys. For example, the annular wall of the seal retaining groove can define a convex annular peak longitudinally between two adjacent concave valleys, and the mating periphery of the seal can define an annular concave groove between two annular convex peaks. The resulting interface thus provides a continuous convoluted contact area that greatly resists the passage of liquid therebetween.

It should be noted that the precise seal interface configuration can be of any suitable complex geometry provided that at least a portion of the seal contact area is non-cylindrical. The interface configuration also preferably has at least two curved and/or linear portions which define an included angle therebetween other than 180 degrees. Thus, the float seat retaining portion profile and mating seal periphery can be formed by single convoluted surface as well as any number of linear and/or curvilinear surfaces such that at least a portion of the single surface or one of the plurality of surfaces is not parallel to the longitudinal axis of the float. Annular peaks and/or valleys with rectilinear cross-sections, such as square or V-shaped, could thus be used.

Moreover, it should be noted that both the seal and float need not be formed with a compound profile, but instead one of the components could be made of a flexible material that can conform to the compound profile of the other component. For example, in one preferred form, the seal is made of a flexible elastomer material that has a simple straight longitudinal profile at its inner diameter that upon being mounted to the float will conform to the compound profile of the float.

In still another aspect, the float/seal interface, the float can have an annular, generally radially extending, seal backing flange at a side of the seal and seal retaining portion opposite the valve seat of the valve body, e.g., longitudinally above the seal. The flange acts as a seal backstop by providing structural support to the outer periphery of the seal should it flex longitudinally away from the valve seat. It also acts to reduce drag on the seal in the longitudinally downward direction when the float is pulled up by the trip lever, and thereby helps maintain a tight connection at the float/seal interface.

The flange can include an opening, preferably multiple openings in the form of open-ended slots (for ease of manufacture) that are spaced apart along the flange. These slots better expose the non-sealing side of the seal to the tank water so that the water pressure head in the tank can act directly on the seal to assist in tightly seating the seal. By providing a backing flange to support the seal, the seal can be made of a soft, flexible material that conforms well to the valve seat. The soft seal also seats quietly, and since the flange is there to backstop the seal, there is no need for contact between two hard parts of the float and valve body, thereby reducing valve closure noise.

These and other advantages of the invention will be apparent from the detailed description and drawings. What follows are one or more preferred embodiments of the present invention. To assess the full scope of the invention the claims should be looked to as the preferred embodiment(s) are not intended as the only embodiment(s) within the scope of the invention.

DETAILED DESCRIPTION OF THE PREFERRED EMBODIMENTS

Figure 1:
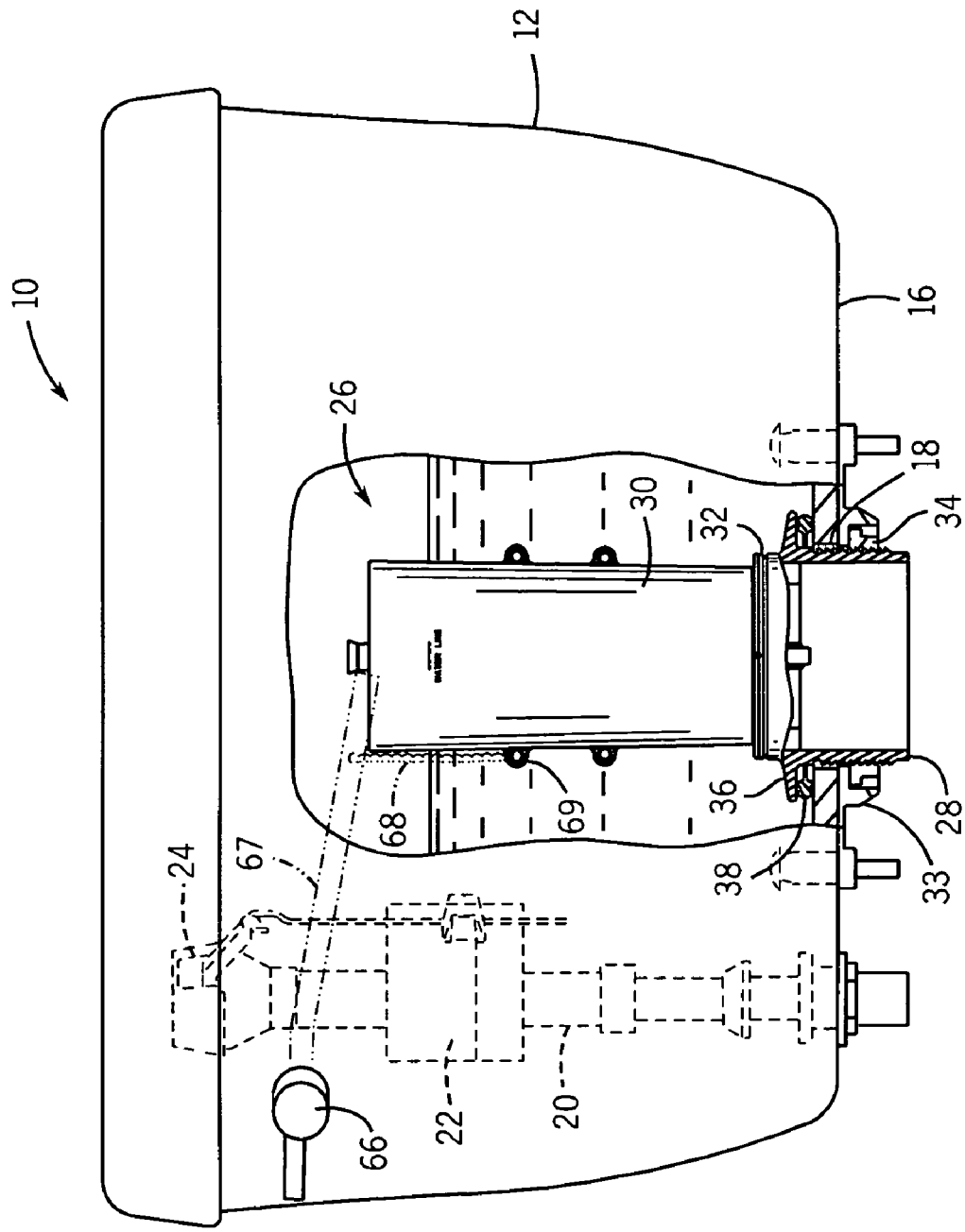
FIG. 1 is a partial sectional front view of a canister flush valve assembly according to the present invention mounted in a toilet tank.

Referring now to the drawings, FIG. 1 shows a toilet 10 which includes a water tank 12 and a bowl section (not shown). The tank 12 has a horizontal bottom wall 16 with an outlet opening 18, which leads to a channel in an upper rim of the bowl. Mounted inside the tank is the usual water supply pipe 20 with a float 22 operated supply valve 24 for controlling the flow of supply water into the tank 12. A flush valve assembly 26 is mounted inside the tank 12 over the outlet opening 18 to control the flow of water from the tank 12 to the bowl during a flush cycle.

Figure 2:
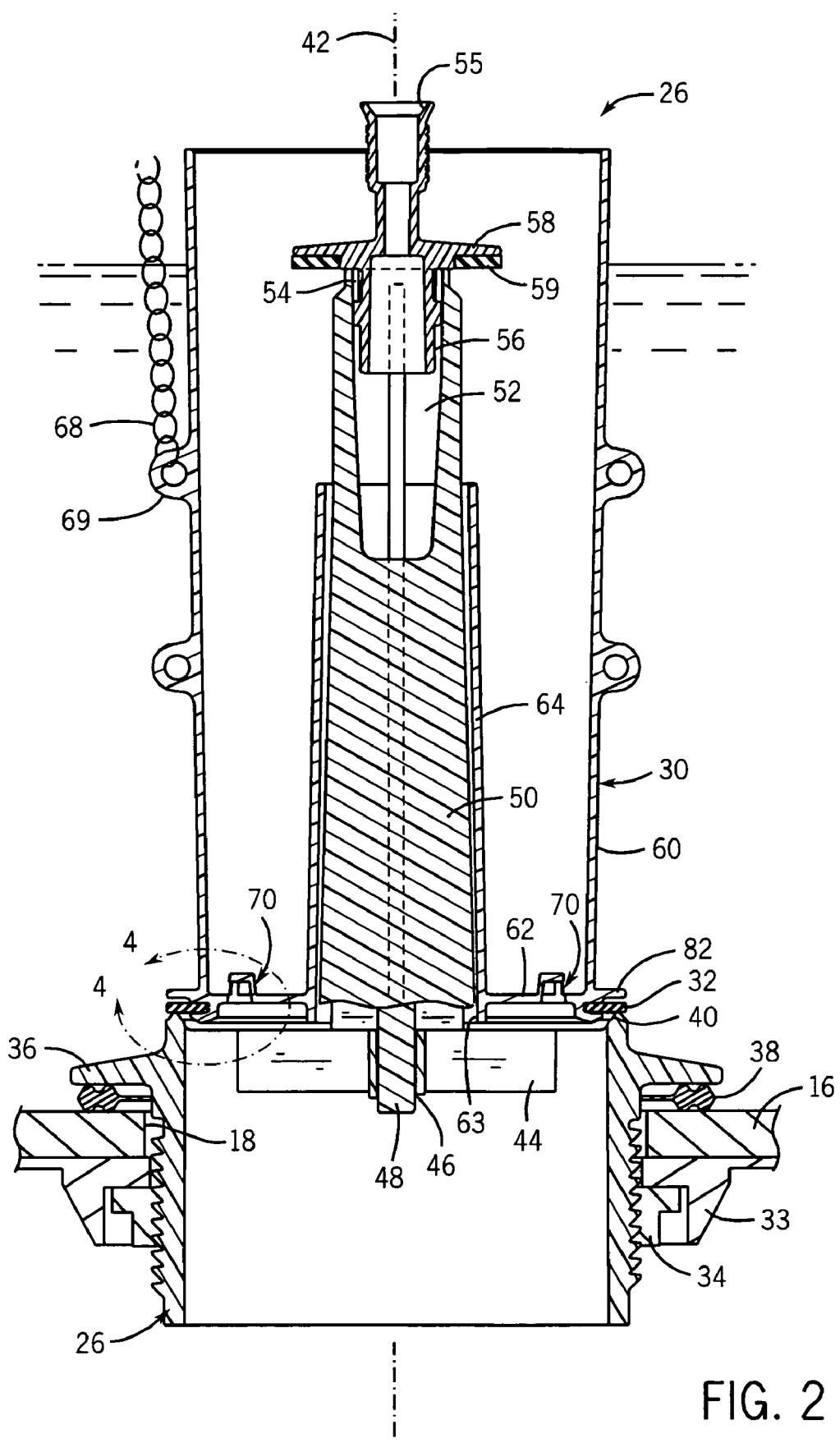
FIG. 2 is a vertical sectional view of the canister flush valve shown in FIG. 1 in its normally closed position.
Figure 3:
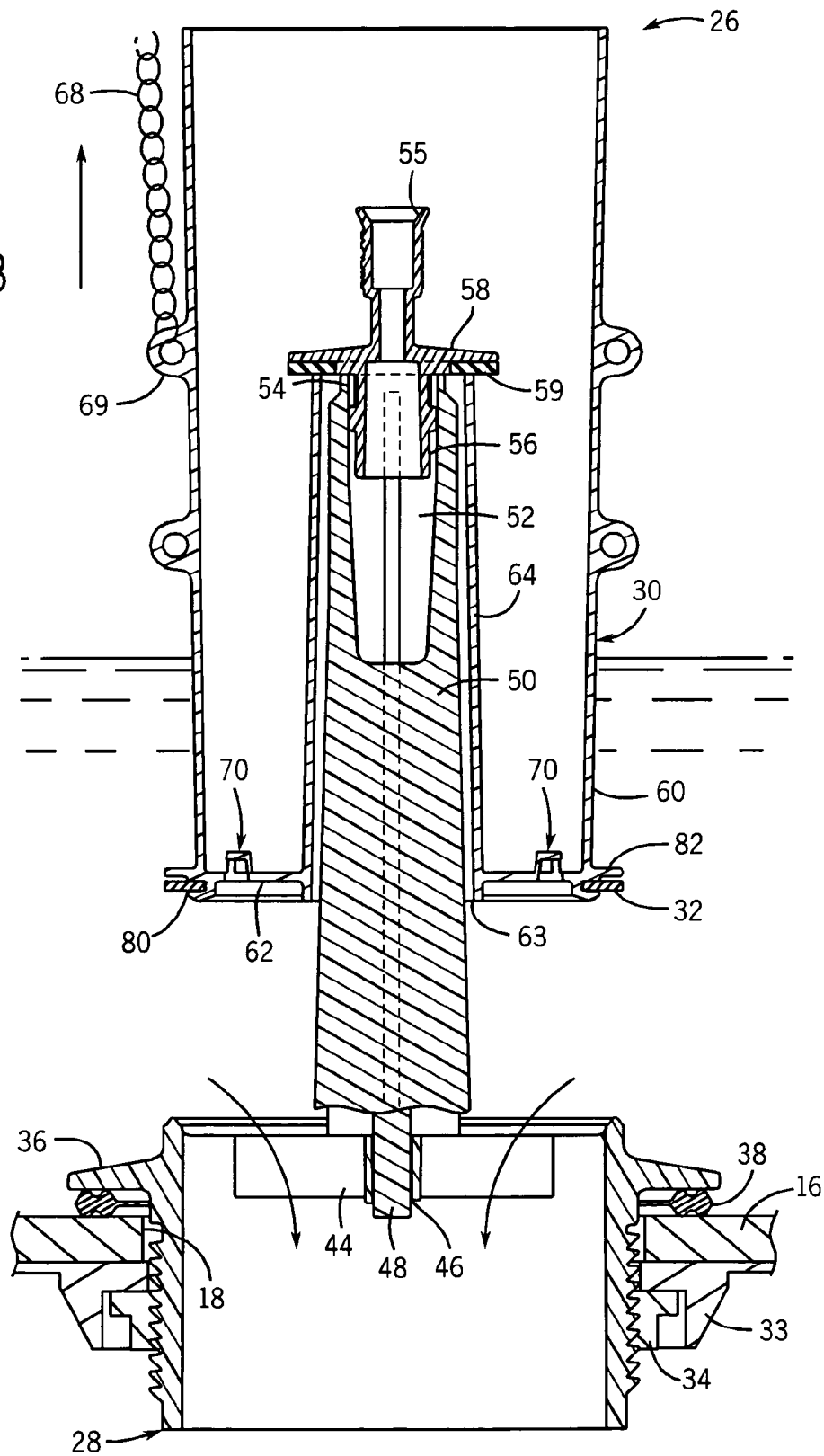
FIG. 3 is a sectional view similar to that of FIG. 2 albeit with the canister flush valve shown in an open position to allow water in the toilet tank to enter a toilet bowl during a flush cycle.
Figure 6:
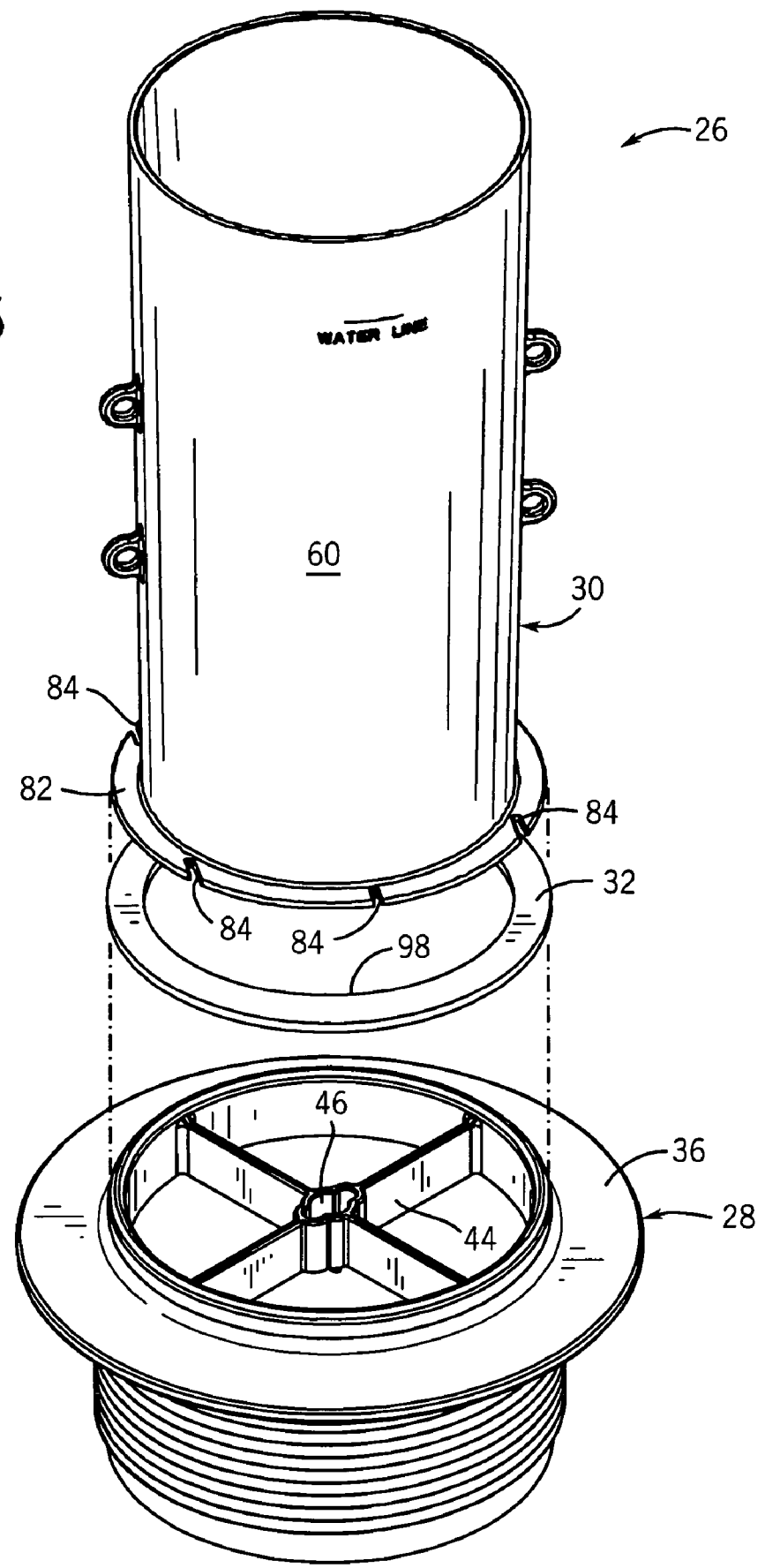
FIG. 6 is an exploded perspective view of the canister flush valve float, seal, and valve body.

Referring to FIGS. 1, 2 and 6, the flush valve assembly 26 is mounted vertically upright in the tank 12 and primarily includes a valve body 28, a float 30 and a seal 32. The valve body 28 and float 30 are preferably a non-corrosive material, such as a suitable plastic. The seal can be made of a flexible material, for example a suitable elastomer, such as vinyl, EPDM rubber, or silicon, which has particularly good chemical/corrosion resistance properties. The lower end of the valve body 28 extends through the tank outlet opening 18 can has external threads that engages a gasket 33 and a threaded retaining nut 34 that threads tightly against an underside of the tank bottom wall 16. The valve body 28 also has a flange 36 that clamps a suitable gasket 38 against an upper side of the bottom wall 16 and mounts the flush valve assembly 26 to the tank 12.

In an alternate configuration not shown, the lower end of the valve body can have three prongs that engage the underside of the bottom wall 16 to mount the flush valve assembly to the tank. This connection is similar to that disclosed in U.S. Pat. No. 4,433,446, which is assigned to the assignee of the present invention, and the disclosure of which, particularly FIGS. 2 and 4-6 and the related description therein, is hereby incorporated by reference.

The valve body 28 defines a generally cylindrical flow path leading from a circular valve seat 40 at it is upper end through the tank outlet opening 18. The valve body 28 and flow passage are generally concentric with a longitudinal axis 42. Bracing 44 extend from the outer wall of the valve body to support a central opening 46 that receives a mounting stem 48 of a separate guide post 50 extending up from the valve body along the axis 42. The opening 46 is generally oblong to allow two small ears (not shown) on the stem 48 to pass through the opening when the post 50 is oriented properly and with a ¼ turn the ears restrict separation of the post 50 from the valve body 28. The post 50 has a generally x-shaped upwardly tapering cross-section with a central void 52 and ring 54 at an upper end. A lower part of the stop 56 fits down into the void 52, again with notches and ears (not shown) allowing insertion and removal in one orientation but otherwise restricting separation of the stop 56 from the post 50. The stop 56 has a large diameter flange section 58 that extends radially, perpendicular to the longitudinal axis 42, further than the post 50. The flange section 58 backs a gasket 59. The stop 56 is captured in the top of the post by a ¼ turn ear and notch arrangement (not shown). The stop 56 is hollow and open ended so that a bowl refill line (not shown) coming from the supply inlet valve can be attached to a fitting 55 of the stop 56.

The float 30 is an upright, cup-shaped unitary body integrally formed with an outer longitudinal cylindrical wall 60 with an upper end open to the ambient air above the tank water, a radial bottom wall 62 and a central longitudinal overflow tube 64 that fits about the post 50 to mount the float 30 to the valve body 28. Should the tank be filled above its water fill height, overflow water will spill over the open upper end of wall 60 to the interior of the float. The overflow water can drain from the float and out of the tank through the flow passage in the valve body 28 through small bleed openings 70 in the bottom wall 62. If the overflow water enters the float faster than it is drained, it will begin to fill the float until it reaches the open upper end of the overflow tube 64, after which it will drain through the overflow tube 64 (around the post 60) and exit through an opening 63 in the bottom wall 62 at the lower end of the overflow tube 64. Also, after a flush, water from the refill line fills the bowl by passing from the line through the stop 56 and the overflow tube 64 (again around the post 50 and out the large, central opening in the bottom wall 62) and the flow passage of the valve body 28.

The overflow tube 64 of a lesser longitudinal dimension than the post 50 so that the float 30 can travel longitudinally up and down the post 50 during a flush cycle. The float 30 is captured between the valve seat 40 and the large diameter section 58 of the stop 56. The gasket 59 seats against the top edge of the overflow tube 64 and reduces associated contact noise. The float 30 is linked to the trip lever 66 of the toilet by a lever arm 67 and a chain 68 connected to one of two longitudinally spaced tabs 69 at each "side" of wall 60.

As shown in FIGS. 2, 4, 7 and 8, the bottom wall 62 has five spaced apart "hooded" bleed openings 70. The hooded bleed openings 70 are integral structures including a radial baffle 72 spaced up from the bottom wall by three longitudinal legs 74. Longitudinal windows 76 are formed between the baffle 72, legs 74 and bottom wall 62 to provide access to the small openings 78 in the bottom wall. The bleed openings 70 allow for drainage of overflow water (as mentioned above), but primarily are used to control the closure timing of the float, and thereby the amount of water consumed in a flush cycle, by allowing a controlled amount of water to flow up into the interior of the float 30 during a flush cycle. The water inside the float 30 will add mass to the float so that it tends "sink" more rapidly than without it. This works to reseat the seal 32 quicker so that there is a minimum water level in the tank that provides a pressure head sufficient to firmly reseat the seal 32. The baffles 72 of the bleed openings 70 obstruct the longitudinal path of the incoming bleed water, causing it to be redirected radially through the windows 76 after passing through the openings 78 in the bottom wall 62. This allows the desired flow into and out of the float 30, but prevents the incoming water from spraying up through the float and hitting the underside of the tank lid, thereby avoiding any associated noise and leakage around the tank lid.

As mentioned, the bleed openings are used primarily to control the closure timing of the valve, that is, to control the time the float is off of the valve body and the seal is unseated from the valve seat. The quantity and size of the bleed openings can be selected to vary the flow volume into the float, and thereby the overall mass of the float, during the flush cycle. In the preferred embodiment described herein, there are five bleed openings in the bottom wall 62 of the float spaced equally around the axis 42, including two ¼" openings, two 3/16" openings and one ⅛" opening. Since the preferred float is a unitary molded plastic structure, the openings can be easily formed closed or open during the molding process to achieve the desired closure timing. The smallest opening provides fine tuning of the closure time, with such a ⅛" opening causing a delay in closure time corresponding to adding about 0.03 gallons to the flush. The other openings have a proportional effect on the closure time and water consumption.

Referring now to FIGS. 2-5, the lower end of the float 30 defines an annular circumferential seal retaining groove 80 opening outwardly in a radial direction. The seal 32 fits about the float 30 concentric with axis 42 and is retained in the groove 80 in a generally radial orientation. Adjacent to the groove 80 is a circumferential, radially extending seal backing flange 82 located to a longitudinal side of the groove 80 opposite the valve seat 40.

The backing flange 82 extends radially outward past that of the valve seat 40 about the distance of extension of the seal 32. The backing flange 82 acts as a backstop for the outer portion of the seal 32 that is not retained in the groove 80. Should the seal 32 be flexed away from the valve seat 40, such as if the float were to become cocked, the rigid backing flange 82 will resist further movement so that the seal 32 will seat against the valve seat 40. The presence of the backing flange 82 allows a softer, more flexible material to be used for the seal 32, which can better conform to the valve seat and provide better sealing. The softer seal also reduces valve noise as the valve closes, since the contact is between the seal and the valve seat and no contact is required between rigid (plastic on plastic) structures of the float and the valve body to limit downward travel of the float. Moreover, the flange 82 shields the seal 32 to reduce the drag on the seal during the upstroke of the float 30, which reduces loosening of the joint at the float/seal interface.

Figure 7:
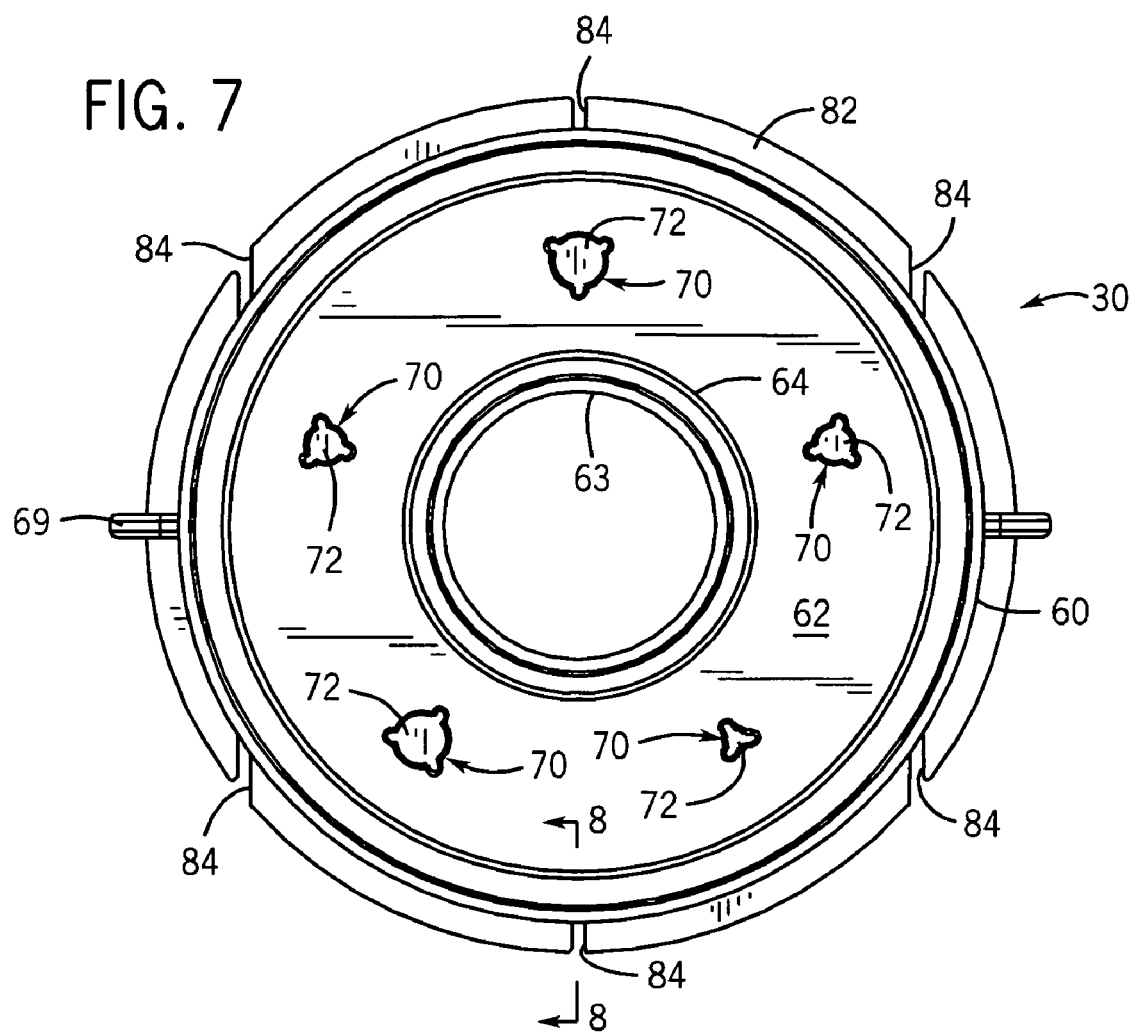
FIG. 7 is a top plan view of the float.
Figure 8:
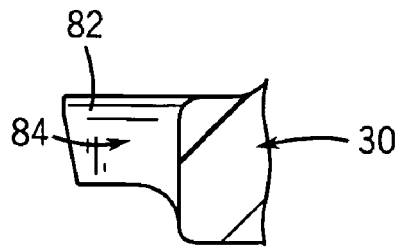
FIG. 8 is an enlarged partial sectional view taken along line 8-8 of FIG. 7.

Another important feature of the backing flange 82 is that it has a number of slots 84, see FIGS. 7 and 8, spaced about the axis. In the preferred embodiment shown, there are six slots oriented in three parallel columns in the view shown in FIG. 7. The slots serve to better allow the water pressure head in the tank to act directly in a longitudinal downward direction on the seal 32 so that the pressure head will apply a sealing force tending to seat the seal 32 on the valve seat 40. The slots also break up any suction between the underside of the flange and the upper side of the seal should the seal be pushed back against the flange, thus allowing the seal to return to its normal position. While slots that open at the outer edge of the flange 82 are preferred because of the ease of manufacture, other through holes and opening orientations could be used.

Referring again to FIGS. 4 and 5, the closed end of the seal retaining groove 80 is defined by an annular wall 96 having a compound profile. The term "compound profile" as used herein refers in general to a any profile defining a non-cylindrical annular surface when revolved about an axis, and more particularly to a profile defined by a single continuous curve or the combination of multiple intersecting linear and/or curvilinear segments. When formed of multiple linear/curvilinear segments, adjacent segments should form an included angle of other than 180 degrees. In the case of a single curve, at least two adjacent sections of the curve should have differing radii of curvature or intersect an inflection point so that the adjacent sections have different concavity. Thus, under one satisfactory meaning of compound profile, the profile would form a continuous curve defining one or more convex peaks and one or more concave valleys. Another satisfactory meaning of this term is a profile that defines a path which defines a bend or included angle of more than 90 degrees, for example a convoluted serpentine path. While various specific configurations fall within the meaning of the term, a compound profile will result in an annular float/seal interface with a contact area that resists the passage of liquid therebetween better than the contact area associated with a straight linear profile.

Since the seal 32 is preferably a flexible, stretchy elastomer, its inner periphery or diameter 98 will conform to the compound profile of the groove wall 96. As such, it need not be machined or otherwise formed to have a permanent mating compound profile of its own. The seal 32 can thus have an inner diameter with a simple, linear profile defined by a cylindrical surface. However, if a less conformable material is used, the seal can also have a compound profile selected to mate with that of the groove wall 96.

Figure 4:
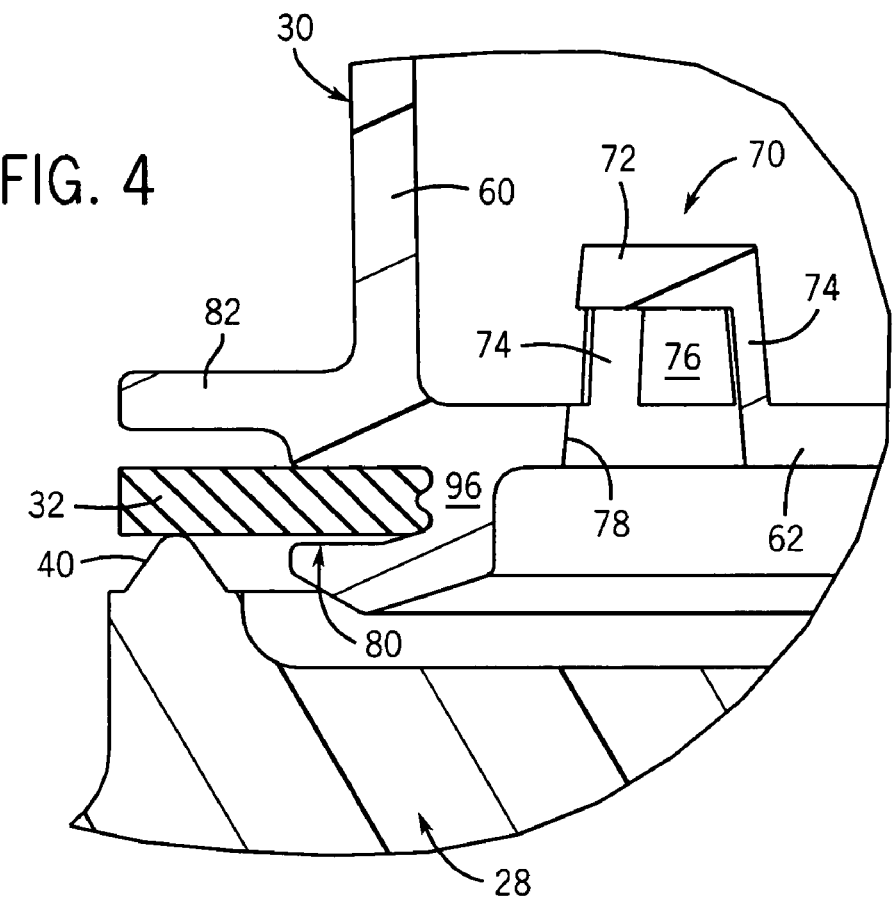
FIG. 4 is an enlarged partial sectional view taken along arc 4-4 of FIG. 2 showing the canister flush valve seal against the valve seat in the closed position of FIG. 2.
Figure 5:
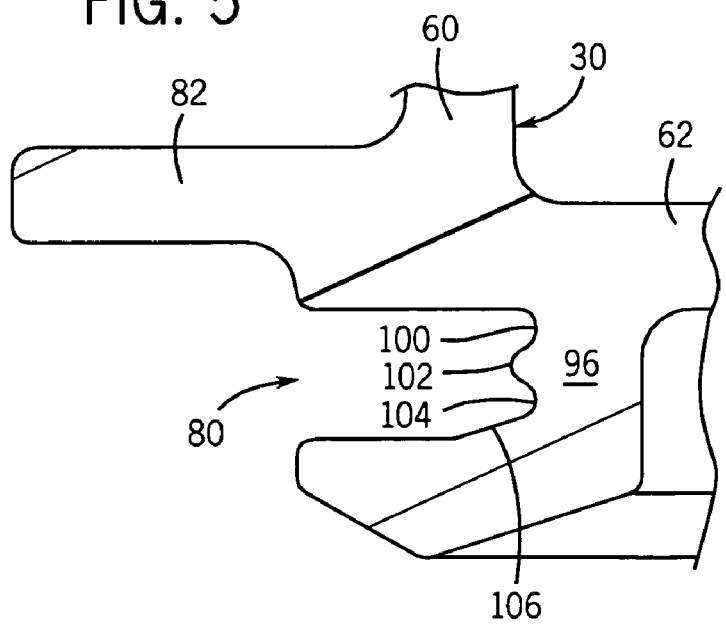
FIG. 5 is a partial sectional view similar to FIG. 4 showing a compound profile of a seal retaining groove with the valve seal removed.

In the illustrated embodiment, the annular groove wall 96 defines a compound profile, when taken in the longitudinal direction as shown in FIG. 5, formed of a single continuous curve, with two inflection points, defining a concave valley 100, a convex peak 102 and another concave valley 104, the peaks and valleys extending in a radial direction and the valleys 100 and 104 being longitudinally above and below the peak 102, respectively. As shown in FIG. 4, the inner diameter 98 of the seal 32 conforms to the compound profile to create mating peaks and valleys.

The compound profile thus creates an inter-digitated joint, such as a tongue and groove, following a convoluted, serpentine longitudinal path. When revolved about the axis 42, the convex peaks become annular ribs or peak surface and the concave valleys become annular grooves or valley surfaces. The seal contact area thus occurs between convoluted annular surfaces, resulting in a float/seal interface that is highly resistant to liquid migration.

Resistance to liquid migration through the float/seal interface is furthered by virtue of the contact area between the radial surfaces (at the top and bottom sides) of the seal 32 and the groove 80. Moreover, the compound profile of the groove annular wall 96 includes an oblique angled linear segment, or chamfer, 106 that forms an annular oblique surface adding further complexity to the float/seal interface so as to even better resist liquid migration, as well as to serve as a ramp facilitating assembly of the seal 32 into the groove 80. The top portion of the ramp also helps position the seal to ensure that the convex/concave surfaces are fully mated.

The peak 102 and the chamfer 106 thus provide multiple distinct pressure points creating multiple height seal contact locations spaced apart in the longitudinal direction. Thus, in the preferred embodiment illustrated in the drawings, for tank water to migrate around the seal it would have to travel between the seal and float radially along the upper side of the seal, turn 90° and travel longitudinally through the valley 100, turn 90° in the opposite direction around the peak 102, turn back 90° through valley 104, then turn along the chamfer 106 and finally travel radially past the underside of the seal.

Regarding the operation of the flush valve, prior to performing a flush operation, the flush valve is in the position shown in FIGS. 1 and 2, with the float 30 and seal 32 seated on the valve seat 40 and the water level in the tank 12 being "full". Actuating the trip lever pulls the float 30 upwardly sufficient to cause it to unseat the seal 32 from the valve seat 40 and be pulled up into the position shown in FIG. 3. Since the float body is open at the upper end such that its interior is in communication with the ambient air above the tank water, the float is suspended not by a trapped air volume, but instead entirely by the buoyancy force of the water acting on the outer surfaces of walls 60 and 62. Water in the tank 12 can flow through the valve body 28 and out through the tank outlet opening 18 to the bowl. Water and waste in the bowl are evacuated to plumbing waste lines in the usual manner through a trap (not shown). Tank water flows into the float 30 through the bleed openings 70, and when sufficiently heavy and the tank 12 drains low enough, the weight of the float 30 causes it to fall under gravity and seat the seal 32 against the valve seat 40. The flush cycle completes after the tank 12 is refilled with water sufficient to trip the supply valve.

It should be appreciated that merely preferred embodiments of the invention have been described above. However, many modifications and variations to the preferred embodiments will be apparent to those skilled in the art, which will be within the spirit and scope of the invention. Therefore, the invention should not be limited to the described embodiments. To ascertain the full scope of the invention, the following claims should be referenced.

What is claimed is:

1. A flush valve for controlling the flow of water from a toilet tank through an outlet to a toilet bowl, the valve comprising:
   a valve body defining an outlet valve seat;
   a float movable with respect to the valve body, the float having a seal retaining portion with a compound profile defined by at least one non-cylindrical annular surface; wherein the float has a bottom well at least one hooded bleed opening having a baffle that is spaced above an opening in the bottom wall; and
   a seal having a compound peripheral surface mating with the compound profile of the float seal retaining portion to mount to the float for seating against the valve seat.

2. The flush valve of claim 1, wherein the compound profile defines an annular projection.

3. The flush valve of claim 2, wherein the float extends along a longitudinal axis and wherein the projection extends in a radial direction essentially perpendicular to the axis.

4. The flush valve of claim 3, wherein the compound profile defines at least one annular valley adjacent to the projection.

5. The flush valve of claim 1, wherein the compound profile includes at least one concave annular valley and at least one convex annular projection.

6. The flush valve of claim 1, wherein the seal retaining portion includes an annular groove having an annular wall defining the compound profile.

7. The flush valve of claim 1, wherein the seal peripheral surface is an inner diameter.

8. The flush valve of claim 1, wherein the float has a flange proximate to the seal and to a side of the seal opposite the valve seat.

9. The flush valve of claim 8, wherein the flange includes at least a through opening therein.

10. The flush valve of claim 1, wherein the baffle is formed as a unitary part of the bottom wall.

11. The flush valve of claim 10, wherein the float has a plurality of hooded bleed openings.

12. The flush valve of claim 1, wherein the float is in the form of a generally cylindrical canister.

\* \* \* \* \*

UNITED STATES PATENT AND TRADEMARK OFFICE
CERTIFICATE OF CORRECTION

PATENT NO.        : 7,634,821 B2
APPLICATION NO.   : 11/268151
DATED             : December 22, 2009
INVENTOR(S)       : Peter W. Denzin Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 936 days.

Signed and Sealed this

Ninth Day of November, 2010

David J. Kappos
*Director of the United States Patent and Trademark Office*

UNITED STATES PATENT AND TRADEMARK OFFICE
CERTIFICATE OF CORRECTION

PATENT NO.       : 7,634,821 B2                                  Page 1 of 1
APPLICATION NO.  : 11/268151
DATED            : December 22, 2009
INVENTOR(S)      : Peter W. Denzin It is certified that error appears in the above-identified patent and that said Letters Patent is hereby corrected as shown below:

In line 8 of claim 1, change [bottom well] to --bottom wall with--.

Signed and Sealed this
Twenty-eighth Day of December, 2010

David J. Kappos
*Director of the United States Patent and Trademark Office*